Patented Mar. 3, 1953

2,630,439

UNITED STATES PATENT OFFICE 2,630,439

COMPOUNDS FOR ALTERING SURFACE CHARACTERISTICS OF LIQUIDS

Lewis O. Gunderson, Chicago, Ill., assignor to Dearborn Chemical Company, Chicago, Ill., a corporation of Illinois No Drawing. Application August 31, 1949, Serial No. 113,484

15 Claims. (Cl. 260—404.5)

1

The present invention relates to a method for conditioning water for the prevention of foaming, and to compositions adapted to be dispersed in systems having a tendency to foam.

In particular, the invention relates to a method for conditioning water in the prevention or reduction of foaming in boilers, for the prevention or reduction of moisture entrainment in the generated steam, for increasing the coefficient of heat transfer in boilers, cooling equipment and heat exchange systems without producing a foaming condition, and for generally improving the character of water for use in steam boilers, heat exchange systems and the like.

The foaming of boiler water is not, as commonly thought, equivalent to an accumulation of foam on top of the surface of boiling water as may occur, for instance, when soap solutions are agitated. The foam or froth obtainable by blowing air through or by stirring a soap solution accumulates on top of the water surface and presents a distinct water-froth interface. Such froth is the result of an equilibrium arrived at after a considerable time as a result of the interplay of various factors, such as surface tension, forces tending to establish the more or less organized surface layer, preferential adsorption and the like, and this interaction leads to the formation of relatively stable froth.

The development of foam in a liquid system being heated, however, may be due to the development of numerous gas or vapor nuclei on the hydrophobic surfaces of particles of matter suspended in the liquid and/or adsorbed on the heating surface. Normally, such numerous small bubbles will resist coalescence while rising through the liquid and will remain stable after reaching the liquid surface where they form a layer of froth or foam.

The compositions and method of the present invention will effectively bring about a pronounced decrease in the number of gas and vapor nuclei, and at the same time, the molecules of the compounds of the present invention will rapidly spread out in the vapor-liquid interface

2 and bubble film to disrupt the stabilizing forces, thus causing the immediate collapse of such vapor bubbles and destroying the froth or foam formation.

The foaming of boiler water, on the other hand, is due to the formation of a large number of steam bubble nuclei on the heating surface from which are generated numerous small steam bubbles having the property of resisting coalescence while rising through the boiling water. The formation of such a large number of relatively small bubbles tends to expand the volume of water without necessarily effecting the formation of a layer of stable froth on top of the boiling water. Further, a water that forms a froth on agitation or upon blowing of air therethrough does not necessarily always foam or expand on boiling.

A differentiation may be made between the terms "foam inhibition" and "defoaming." "Foam inhibition" includes instances where a compound or substance when added to a liquid inhibits the initiation of foam formation, while "defoaming" applies where a compound is added to a solution already in a foaming condition to effectively destroy or collapse such foam. Some compounds often are effective as defoaming agents, that is foam destroyers, while others act as true foam inhibitors, preventing even the initial formation of foam, while still others can act both as defoamers and foam inhibitors. Many of the compounds proposed by the present invention are of the latter type in that they act both as defoamers and foam inhibitors.

The foaming of boiler water is actually a rapid expansion of a water in the steam generating area of the boiler brought about by the fact that rapidly forming, small steam bubbles resist coalescence and, therefore, accumulate in the water to form, in effect, a steam-bubble-expanded water. Small hydrophobic particles dispersed throughout the body of boiler water or adsorbed on the heating surface may act as nuclei, promoting the formation of bubbles, particularly when the pressure is suddenly lowered, as when large amounts of steam are suddenly withdrawn from the boiler. As a consequence, the entire volume of water in the generating area is expanded by myriads of bubbles until the thus formed light water may fill the steam space or become entrained with the high velocity steam leaving the boiler from the restricted steam space. This light water carry-over presents difficulties in that it causes incrustation in the subsequent structural components of the boiler system.

Operation of evaporators for the production of feed water for boilers, especially on sea going vessels, is constantly confronted with carry-over problems resulting in the contamination of the boiler feed water with disastrous results. The concentration of ocean water salines in the evaporator also causes precipitation of calcium and magnesium salts therein, which tend to stabilize foam. The compounds proposed by the present invention are very suitable for dispersion in such evaporators to inhibit the formation of foam and thus avoiding the carry-over problem.

Another problem is presented by the foaming of water in processes of paper manufacture. The compounds of the present invention are also suitable for inhibiting foaming in such systems which operate under non-boiling conditions at atmospheric pressure.

An object of the present invention is to provide a method of inhibiting the tendency of aqueous systems to foam.

A further object of the invention is to prevent foam formation in aqueous or non-aqueous systems wherein foaming is encountered due to the generation of steam under atmospheric or low pressure conditions, wherein foaming is due to agitation and entrainment of air in a system due to turbulence or other agitation, and wherein foam formation is due to aeration of liquid systems and the like.

A further object of the present invention is to provide novel compositions which are suitable for use in systems which have tendencies to foam both at subatmospheric and superatmospheric pressures.

Another important object of the present invention is to provide a method of treating water to prevent foaming or expansion on boiling and to prevent the entrainment of foam with the steam leaving the boiler.

Other important objects of the present invention are to provide flotation agents in minerals separation, conditioning agents for the treatment of textiles, additives agents for the paper industry for altering character of the product, and as plasticizers for various industrial products.

Another object of the present invention is to provide agents for the demulsification of mineral oils in oil fields and processing plants.

The method of present invention comprises dispersing into water which has a tendency to foam a composition containing a compound having one or more acetal type linkages within the molecule and also containing hydrophilic and hydrophobic radicals in a correct balance to produce the necessary surface activity enabling the compounds to act as foam inhibitors.

In one embodiment of the present invention, two separate molecules in themselves having anti-foam properties are reacted together and linked by reaction with an aldehyde to form a compound having greater anti-foam properties than either of the compounds taken individually.

In general, the formulae of the compounds of the present invention may be represented by the following:

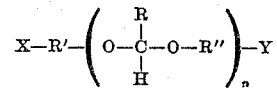

where X and Y are hydrophilic radicals, which may be the same or different, R is an alkyl radical, R' and R'' are alkylene radicals, which may be the same or different, and $n$ is an integer. For most applications, R should contain at least 8 carbon atoms.

The preferred compounds of the present invention are those which contain a single acetal group separating the hydrophilic groups. The general formula for this type of compound may be represented by the following structure:

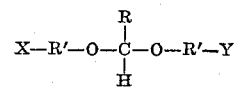

where X and Y are hydrophilic groups, R is an alkyl radical and R' represents the same or a pair of different alkylene groups.

The most easily prepared compounds having a molecular weight of at least 250 are those which contain identical terminal hydrophilic groups, in which case the structure is the following:

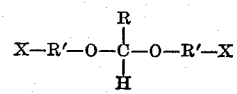

where X, R and R' have the same designations as previously, except when X is OH, $OCH_3$, $OC_2H_5$, $OC_3H_7$ or $OOCH_3$, then R is an alkyl chain of at least 8 carbon atoms, but preferably 11 carbon atoms.

The hydrophilic groups, which appear in the compounds of the present invention, are preferably those of the type of the ester, ether, amine, hydroxy and amide groups. Where the compounds are to be used under atmospheric or sub-atmospheric conditions, the unsubstituted hydrophilic groups may be present, or the groups may be substituted with relatively short chain radicals, in which case R is a long alkyl radical containing at least 8 carbon atoms. Where the compounds are to be used for the generation of steam under atmospheric or superatmospheric pressure, the compounds should preferably have hydrocarbon constituents on the hydrophilic groups which contain at least eight and preferably at least eleven carbon atoms, and R may be a short or long alkyl chain. Where the terminal groups on the molecule are unsubstituted hydroxy groups, and the number of acetal groups in the molecule is less than three, the alkyl substituent on the acetal carbon atom should have at least eight carbon atoms.

The compounds of the present invention may be prepared by reacting a hydroxy containing organic compound such as a glycol, an alkanol amine or polyamine, or an alkyl phenol, or esterified or acylated derivatives thereof with an aldehyde to condense two or more molecules of the original hydroxy containing compounds through an acetal group. This reaction is preferably carried out in the presence of a mineral acid catalyst. Aldehydes and aldehyde derivatives, which may be used, range from acetaldehyde up through aldehydes containing eight and more carbon atoms per molecule. In addition to straight and branched chain aldehydes, aldehyde-reacting compounds such as acetal, aldol, glyoxal, and furfural may be used.

Examples of the above types of compounds are represented by the following formulae:

(1)
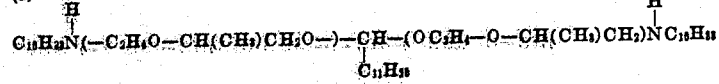

(2)
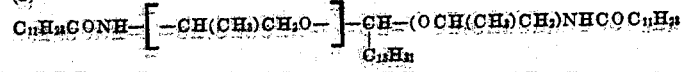

(3)
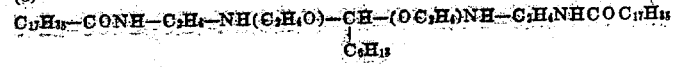

(4)
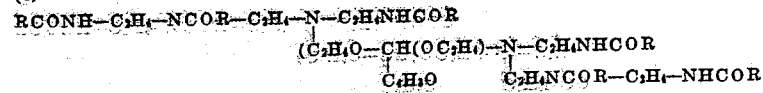

where R is a naphthenic acid residue.

(5) 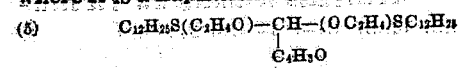

(6) 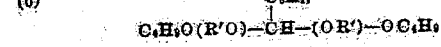

where R'=C₂H₄ or CH(CH₃)CH₂.

(7)
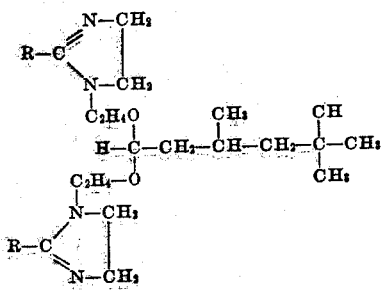

R=naphthenic acid.

Examples of the preparation of the compounds of the present invention are described below.

*Example I*

One mole of monoethanolamine was condensed with one mole of a naphthenic acid having an acid number of approximately 200 at a temperature of 175°±10° C. This reaction was carried out for a period of about 6 hours, resulting in the production of the monoamide. The reaction product thus prepared was condensed with one mole of butyraldehyde at a temperature in the range from 80° C. to 160° C. for a period of between 3 and 5 hours. The resulting product has the following probable structure:

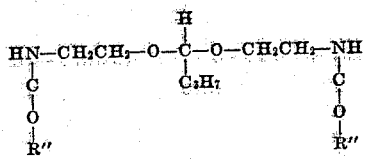

where R'' is the residue of a naphthenic acid.

It is not necessary that two identical molecules be reacted to form the acetal type compound but the reaction may be carried out between dissimilar molecules as shown in the following example:

*Example II*

One mole of monoethanolamine was condensed with one mole of a naphthenic acid in accordance with the method set forth in Example I. Another mole of monoethanolamine was condensed with stearic acid to produce the monoamide.

One mole of the naphthenic amide and one mole of the stearamide were then condensed with the aid of one mole of nonylaldehyde (3,5,5-trimethylhexylaldehyde) to form a compound having the following structure:

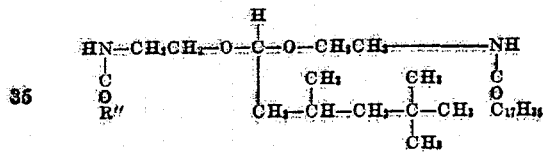

where R'' is the residue of a naphthenic acid.

*Example III*

By substituting monopropanolamine for the monoethanolamine of Example I, a compound having the following probable structure is produced:

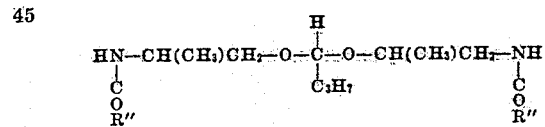

where R'' is the residue of a naphthenic acid. This type of compound is also very effective in inhibiting foam formation.

*Example IV*

A relatively low molecular weight acetal for use in atmospheric foam inhibition was prepared by condensing two moles of ethylene glycol with one mole of stearaldehyde to yield a compound having the following formula:

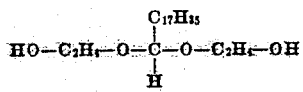

*Example V*

Propylene glycol and laurylaldehyde were condensed and the condensation product then esterified with acetic acid to yield a compound having the following structure:

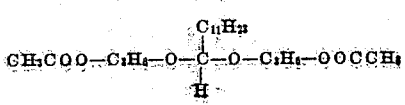

This type of compound is especially adapted for use at sub-atmospheric or at atmospheric conditions.

Example VI

One mole of ethylene glycol and laurylaldehyde were condensed and the resulting condensation product then etherified with ethyl sulfuric acid, to yield a compound having the following probable structure:

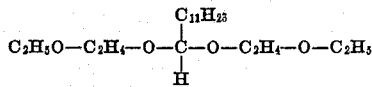

This compound is likewise very effective at atmospheric conditions.

Example VII

Two moles of 1,5 pentamethylene glycol and one mole of nonylaldehyde were condensed and the resulting condensation product esterified with acetic acid to yield a compound having the following probable structure:

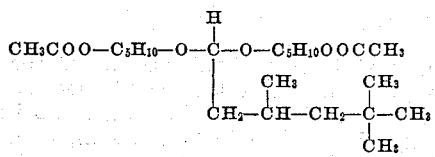

Example VIII

The reaction between the glycol and aldehyde may be carried out for longer periods of time to yield compounds having a relatively high molecular weight. Compounds of this nature, having a molecular weight of at least 900 and preferably 1500 or more, find use in high pressure boilers. One part of ethylene glycol and one part of butyraldehyde were condensed to form a polyacetal glycol having the following general formula:

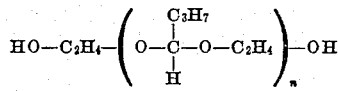

In the above formula $n$ represents an integer of at least 6 and preferably 10 or more, the value of $n$ depending upon the reaction temperatures and the time involved.

Example IX

The alykyl phenols may also be used as a starting material in preparing the acetals of the present invention. For example, 2 moles of octylphenoxyethanol were condensed with 1 mole of acetaldehyde to produce an acetal having the following probable structure:

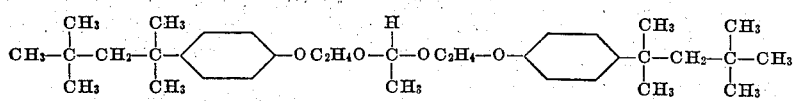

In addition to the acetal type compounds described above, the hemi-acetals are also useful for the purposes of this invention. These hemi-acetals may be prepared by reacting the aldehyde with the glycol in equimolar proportions.

The crude reaction product need not be purified to separate out the acetal type compounds, since the unreacted constituents do not interfere with the utility of the reaction product for the purposes set forth.

The compounds described above may be incorporated into conventional foam inhibiting compositions including substances such as tannin and lignin derivatives, the proportion of the active foam inhibiting compound to the total formula normally being within the range from 1 to 10% by weight. The foam inhibitor may be mixed with tannin and lignin derivatives in water solutions and passed through a colloid mill to produce a stable emulsion, which may be directly added to the boiler feed water or to the water already present in the boiler. The amount of material used depends essentially upon the system into which it is incorporated, but normally from ¼ part per million to 50 parts per million or more of the active foam inhibiting compound should be incorporated into the foaming system. Addition of the compositions is repeated as required to maintain a non-foaming condition.

The foam inhibitor may also be added as a solution in an appropriate solvent, for example isopropyl alcohol rather than in an emulsion form.

The foam inhibiting agents described above may also be used in conjunction with dispersing agents, particularly, wetting agents such as the alkyl sulfates, alkyl sulfonates, and alkyl aryl sulfonates. The addition of such wetting agents is especially advantageous where the foam inhibitors are to be used in the presence of calcium and/or magnesium ions in the aqueous foam system.

It will be understood that modifications and variations may be effected without departing from the scope of the novel concepts of the present invention.

I claim as my invention:

1. A compound capable of altering the surface characteristics of liquids, said compound having the formula

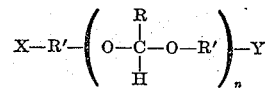

where X and Y are hydrophilic radicals each having a hydrocarbon chain of at least 8 carbon atoms and being selected from the group consisting of ester, ether, amine, hydroxy and amide groups, R is an alkyl radical, R' is an alkylene radical, and $n$ is an integer.

2. A compound capable of altering the surface characteristics of liquids, said compound having the formula

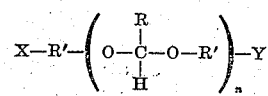

where X and Y are hydrophilic radicals selected from the group consisting of ester, ether, amine, hydroxy and amide groups, each having a hydrocarbon chain of at least 11 carbon atoms, R is an alkyl radical, R' is an alkylene radical, and $n$ is an integer.

3. A compound capable of altering the surface characteristics of liquids, said compound having the formula

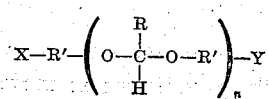

where X and Y are hydrophilic radicals selected from the group consisting of ester, ether, amine, hydroxy and amide groups, R is an alkyl radical containing at least 8 carbon atoms, R' is an alkylene radical, and $n$ is an integer.

4. A compound capable of altering the surface characteristics of liquids, said compound having the formula

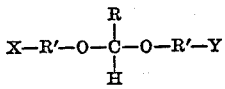

where X and Y are hydrophilic groups selected from the group consisting of ester, ether, amine, hydroxy and amide groups, R is an alkyl radical containing at least 8 carbon atoms, and R' is an alkylene radical.

5. A compound capable of altering the surface characteristics of liquids, said compound having the formula

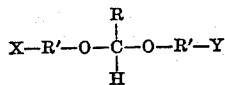

where X and Y are hydrophilic groups selected from the group consisting of ester, ether, amine, hydroxy and amide groups, each containing at least 11 carbon atoms, R is an alkyl radical, and R' is an alkylene radical.

6. A compound capable of altering the surface characteristics of liquids, said compound having the formula

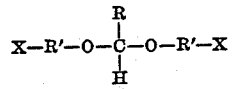

where X is an amide group having a hydrocarbon chain of at least 11 carbon atoms, R is an alkyl radical, and R' is an alkylene group.

7. A compound capable of altering the surface characteristics of liquids, said compound having the formula

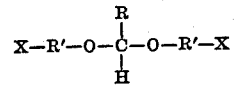

where X is an ester group having a hydrocarbon chain of at least 11 carbon atoms, R is an alkyl radical, and R' is an alkylene group.

8. A compound capable of altering the surface characteristics of liquids, said compound having the formula

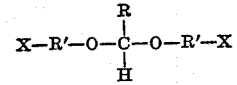

where X is an ether group having a hydrocarbon chain of at least 11 carbon atoms, R is an alkyl radical, and R' is an alkylene group.

9. A compound having the formula

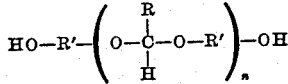

wherein R is an alkyl radical, having at least 8 carbon atoms, R' is an alkylene radical, and $n$ is an integer.

10. A compound having the formula

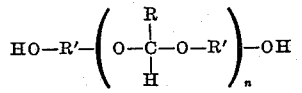

wherein R is an alkyl radical, R' is an alkylene radical, and $n$ is an integer of at least 3.

11. A compound having the formula

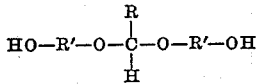

wherein R is an alkyl radical having at least 8 carbon atoms and R' is an alkylene radical.

12. A compound having the formula

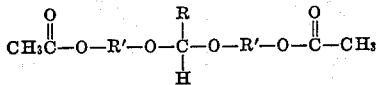

wherein R is an alkyl radical having at least 8 carbon atoms and R' is an alkylene radical.

13. A compound having the formula

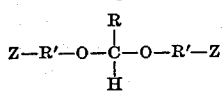

wherein R is an alkyl radical having at least 8 carbon atoms and R' is an alkylene radical, and Z is an alkoxy radical having not more than 2 carbon atoms.

14. A compound having the formula

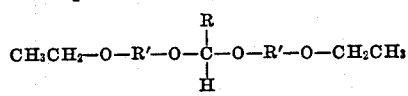

wherein R is an alkyl radical having at least 11 carbon atoms and R' is an alkylene radical.

15. A compound having the formula

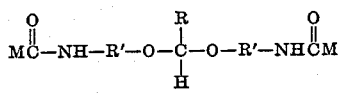

wherein

is a naphthenyl group, R is an alkyl radical, and R' is an alkylene radical.

LEWIS O. GUNDERSON.

REFERENCES CITED

The following references are of record in the file of this patent:

UNITED STATES PATENTS

| Number | Name | Date |
|---|---|---|
| 2,036,304 | Seymour | Apr. 7, 1936 |
| 2,114,122 | Bruson | Apr. 12, 1938 |
| 2,250,407 | De Groote | July 22, 1941 |
| 2,408,527 | Monson | Oct. 1, 1946 |
| 2,461,730 | Gunderson | Feb. 15, 1949 |
| 2,481,899 | Bird | Sept. 13, 1949 |

FOREIGN PATENTS

| Number | Country | Date |
|---|---|---|
| 568,318 | Great Britain | of 1945 |